(12) United States Patent
Baba et al.

(10) Patent No.: US 10,518,619 B2
(45) Date of Patent: Dec. 31, 2019

(54) STRUCTURE OF MOUNTING ELECTRIC DEVICE IN FRONT COMPARTMENT OF VEHICLE

(71) Applicant: TOYOTA JIDOSHA KABUSHIKI KAISHA, Toyota-shi, Aichi (JP)

(72) Inventors: Ryusuke Baba, Nagoya (JP); Shuichi Iwata, Nisshin (JP); Takeyuki Yabuuchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/386,348

(22) Filed: Apr. 17, 2019

(65) Prior Publication Data

US 2019/0344649 A1 Nov. 14, 2019

(30) Foreign Application Priority Data

May 10, 2018 (JP) ................................. 2018-091509

(51) Int. Cl.
*B60K 1/00* (2006.01)
*B62D 21/15* (2006.01)

(52) U.S. Cl.
CPC ............ *B60K 1/00* (2013.01); *B60Y 2200/91* (2013.01); *B62D 21/155* (2013.01)

(58) Field of Classification Search
CPC ................. B62D 21/15; B62D 21/155; B60K 2001/0405; B60K 2001/0411
See application file for complete search history.

(56) References Cited

U.S. PATENT DOCUMENTS

| 6,029,765 | A  | * | 2/2000  | Chou ................... | B60K 5/1216 180/292 |
| 6,367,869 | B1 | * | 4/2002  | Baccouche .......... | B62D 21/155 280/784 |
| 6,374,939 | B1 | * | 4/2002  | Hohnstadt ........... | B60K 5/1208 180/299 |
| 7,201,398 | B1 | * | 4/2007  | Christofaro ........... | B62D 21/02 180/312 |
| 7,380,829 | B2 | * | 6/2008  | Kishima .............. | B62D 21/155 180/232 |
| 7,393,016 | B2 | * | 7/2008  | Mitsui ................... | B62D 25/08 180/232 |
| 7,445,076 | B2 | * | 11/2008 | Shigematsu ......... | B60K 5/1216 180/298 |

(Continued)

FOREIGN PATENT DOCUMENTS

JP        2018-024330 A       2/2018

*Primary Examiner* — Jeffrey J Restifo
(74) *Attorney, Agent, or Firm* — Oliff PLC

(57) ABSTRACT

A structure of mounting an electric device in a front compartment of a vehicle is disclosed. The structure may include: a casing being divided into a first and a second casing; a first and a second through hole provided in the first casing; a first and a second fixing hole provided in the second casing; a first fastening member passing through the first through hole and fixed to the first fixing hole; and a second fastening member passing through the second through hole and fixed to the second fixing hole. The first through hole is located at a far side of the first casing with a vehicle's center line and located at a front half of the first casing. The second through hole is located at a closer side and a rear half of the first casing.

3 Claims, 4 Drawing Sheets

(56) References Cited

U.S. PATENT DOCUMENTS

| | | | | |
|---|---|---|---|---|
| 7,594,559 B2* | 9/2009 | Kitoh | .................... | B62D 21/155 |
| | | | | 180/232 |
| 7,771,137 B2* | 8/2010 | Anzai | .................... | B62D 21/11 |
| | | | | 180/232 |
| 7,878,287 B2* | 2/2011 | Buchwitz | ............... | B62D 21/11 |
| | | | | 180/299 |
| 7,883,113 B2* | 2/2011 | Yatsuda | ................. | B62D 21/11 |
| | | | | 180/232 |
| 7,992,926 B2* | 8/2011 | Tamakoshi | ........... | B62D 21/155 |
| | | | | 296/187.09 |
| 8,016,067 B2* | 9/2011 | Horgas | .................... | F16F 15/08 |
| | | | | 180/232 |
| 8,863,877 B2* | 10/2014 | Saeki | ....................... | B60K 1/04 |
| | | | | 180/271 |
| 8,955,635 B2* | 2/2015 | Idaka | .................... | B62K 11/04 |
| | | | | 180/299 |
| 8,985,630 B2* | 3/2015 | Sangha | ................ | B62D 27/065 |
| | | | | 280/124.109 |
| 10,363,964 B2* | 7/2019 | Takahashi | ............ | B62D 21/155 |

* cited by examiner

STRUCTURE OF MOUNTING ELECTRIC DEVICE IN FRONT COMPARTMENT OF VEHICLE

CROSS-REFERENCE TO RELATED APPLICATION

This application claims priority to Japanese Patent Application No. 2018-91509 filed on May 10, 2018, the contents of which are hereby incorporated by reference into the present application.

TECHNICAL FIELD

The teaching disclosed herein relates to a structure of mounting an electric device in a front compartment of a vehicle.

BACKGROUND

In recent years, various electric devices have been mounted on vehicles. For example, in electric vehicles, a power converter that converts electric power output from a DC power source into electric power for driving a motor is mounted. In an electric vehicle described in Japanese Patent Application Publication No. 2018-24330 (Patent Document 1), an electric power control unit that controls electric power for driving a traction motor is fixed onto a motor casing. If the casing of the electric device to which a high voltage is applied is damaged by a collision impact, a high-voltage-applied component of the electric device may be exposed from the casing. In the electric vehicle described in Patent Document 1, the electric power control unit is supported on the motor casing by a front bracket and a rear bracket. When such an electric vehicle collides at its front with an obstacle, the bracket is deformed to displace the electric power control unit, thereby reducing a collision impact applied onto the electric power control unit.

Patent Document 1 describes a technique for preventing the motor casing from being damaged due to an impact applied to the motor casing through the rear bracket. The rear bracket is attached to the motor casing by a first bolt disposed at a front side and a second bolt disposed at a rear side. The rear bracket is provided with a first insertion hole into which the first bolt is inserted and a second insertion hole into which the second bolt is inserted. A gap (clearance) between the second bolt and the second insertion hole is larger than a gap between the first bolt and the first insertion hole. In addition, a portion of the motor casing with the first bolt attached thereto has a higher strength than a portion of the motor casing with the second bolt attached thereto. In the structure described in Patent Document 1, the gap between the second bolt and the second insertion hole is larger than the gap between the first bolt and the first insertion hole. Due to this, if a collision impact is applied from the front side of the vehicle to the rear bracket, a larger load is applied onto the first insertion hole having the small gap than the second insertion hole having the large gap. In short, a larger load is applied onto a high-strength area around the first insertion hole, whereas a relatively small load is applied onto a low-strength area around the second insertion hole. Consequently, the collision impact is dispersed depending on the strength of the portion of the motor casing, so that the motor casing is less likely to be damaged.

SUMMARY

The technique of Patent Document 1 is a technique for preventing the motor casing from being damaged when a collision impact is applied to the vehicle from its front. In contrast, the present art disclosed herein provides a technique for preventing a casing of an electric device mounted in a front compartment of a vehicle from being damaged when a collision impact is applied to the electric device from its obliquely front.

In the technique disclosed herein, an electric device is mounted in a front compartment of a vehicle. The electric device includes a first casing and a second casing which are divided from each other in an up-down direction. The first casing includes a first through hole and a second through hole. The second casing includes a first fixing hole to which a first fastening member passing through the first through hole is fixed and a second fixing hole to which a second fastening member passing through the second through hole is fixed. The first through hole is located at a far side of the first casing with respect to a center line of the vehicle in a direction along a body width of the vehicle and located at a front half of the first casing. The second through hole is located at a closer side of the first casing with respect to the center line of the vehicle in the direction along the body width of the vehicle and located at a rear half of the first casing. A first gap between the first fastening member and the first through hole is larger than a second gap between the second fastening member and the second through hole.

In the above-mentioned vehicle-mounted structure, the first through hole and the first fastening member are located closer to an obliquely front corner of the vehicle than the second through hole and the second fastening member are. If an obstacle collides with the vehicle from the obliquely front corner, a collision impact load applied to an area around the first fixing hole with the first fastening member fixed thereto tends to become larger than a collision impact load applied to an area around the second fixing hole with the second fastening member fixed thereto. This is because a portion of the casing between the first fixing hole and the second fixing hole is deformed to absorb the collision impact load, resulting in a reduced collision impact load transmitted to the second fixing hole. By setting the first gap to be relatively larger than the second gap, the first casing can be displaced from the second casing within the area around the first fixing hole at a greater degree than within the area around the second fixing hole. As a result, the impact load applied to the area around the first fixing hole becomes smaller, resulting in a decreased difference between the impact loads applied to the respective areas around the first and second fixing holes. Thus, unevenness of the collision impact load is alleviated, so that the casing is less likely to be damaged.

Typically, the first through hole and the first fixing hole may be located at a front corner of the electric device at a far side with respect to the center line, whereas the second through hole and the second fixing hole may be located at a rear corner of the electric device at a closer side with respect to the center line.

Details and modifications of the technique disclosed herein will be described in the "DETAILED DESCRIPTION" below.

DETAILED DESCRIPTION

Figure 1:
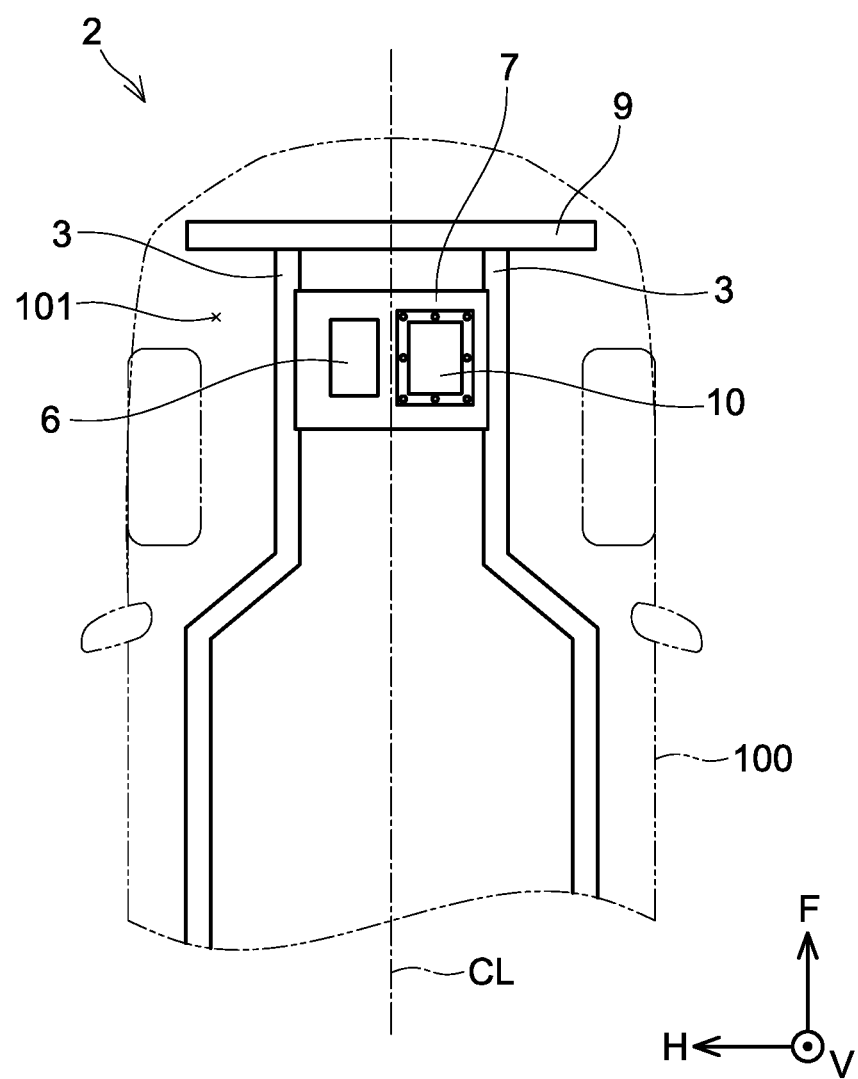
FIG. 1 is a plan view of an electric vehicle that employs a vehicle-mounted structure in an embodiment.

Representative, non-limiting examples of the present teachings will now be described in further detail with reference to the attached drawings. This detailed description is merely intended to teach a person of skill in the art further details for practicing preferred aspects of the present teachings and is not intended to limit the scope of the teachings. Furthermore, each of the additional features and teachings disclosed below may be utilized separately or in conjunction with other features and teachings to provide an improved structure of mounting an electric device in a front compartment of a vehicle.

Moreover, combinations of features and steps disclosed in the following detailed description may not be necessary to practice the teachings in the broadest sense, and are instead taught merely to particularly describe representative examples of the teachings. Furthermore, various features of the above-described and below-described representative examples, as well as the various independent and dependent claims may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Some features of a structure of mounting an electric device disclosed herein will be described.

In the vehicle-mounted structure disclosed herein, the first casing and the second casing may be joined together by a third fastening member, in addition to the aforesaid first and second fastening members. Specifically, a third through hole may be provided between the first through hole and the second through hole of the first casing. The second casing may be provided with a third fixing hole to which the third fastening member passing through the third through hole is fixed. A third gap between the third fastening member and the third through hole may be smaller than the first gap and larger than the second gap. The third fixing hole, which is located between the first and second fixing holes, does not worsen unevenness of a collision load as long as a size of the third gap is in a range between sizes of the first and second gaps. By joining the first casing to the second casing with a larger number of fastening members, the load can be dispersed.

Embodiments

A vehicle-mounted structure 2 of an embodiment will be described below with reference to the accompanying drawings. The vehicle-mounted structure 2 of the embodiment is applied to a power converter 10 in an electric vehicle 100.

Figure 2:
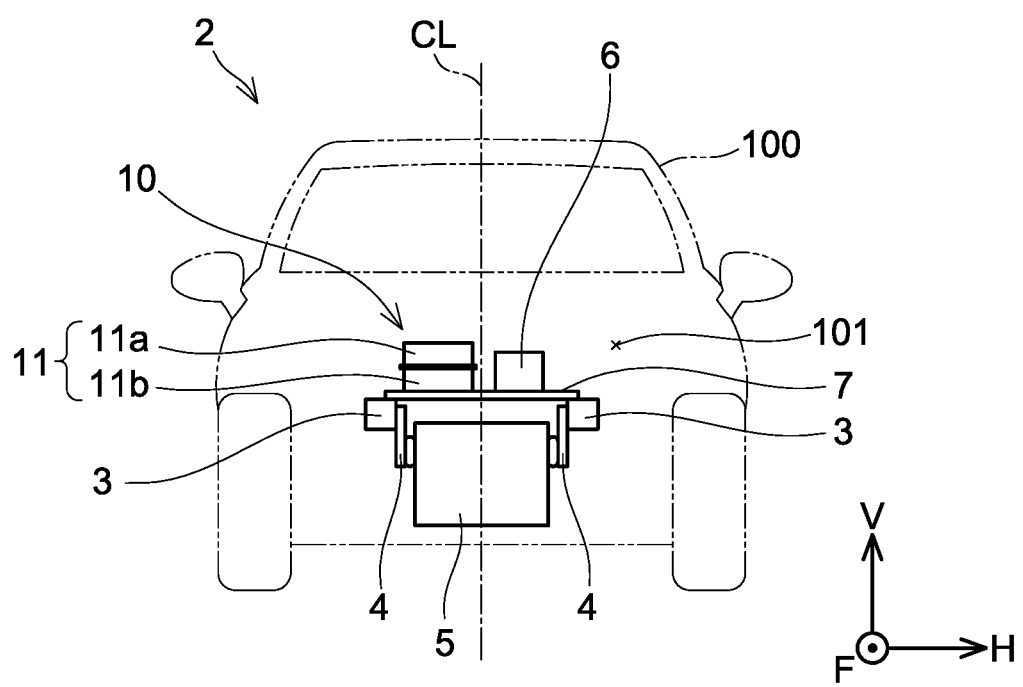
FIG. 2 is a front view of the electric vehicle that employs the vehicle-mounted structure in the embodiment.

FIG. 1 is a plan view of the electric vehicle 100; FIG. 2 is a front view of the electric vehicle 100. In each of FIGS. 1 and 2, an imaginary line represents an outline of the electric vehicle 100. The electric vehicle 100 has a front compartment 101 in which an electric traction motor 5, the power converter 10, and a battery charger 6 are mounted. The electric traction motor 5 will be simply referred to as the motor 5 hereinafter.

Figure 3:
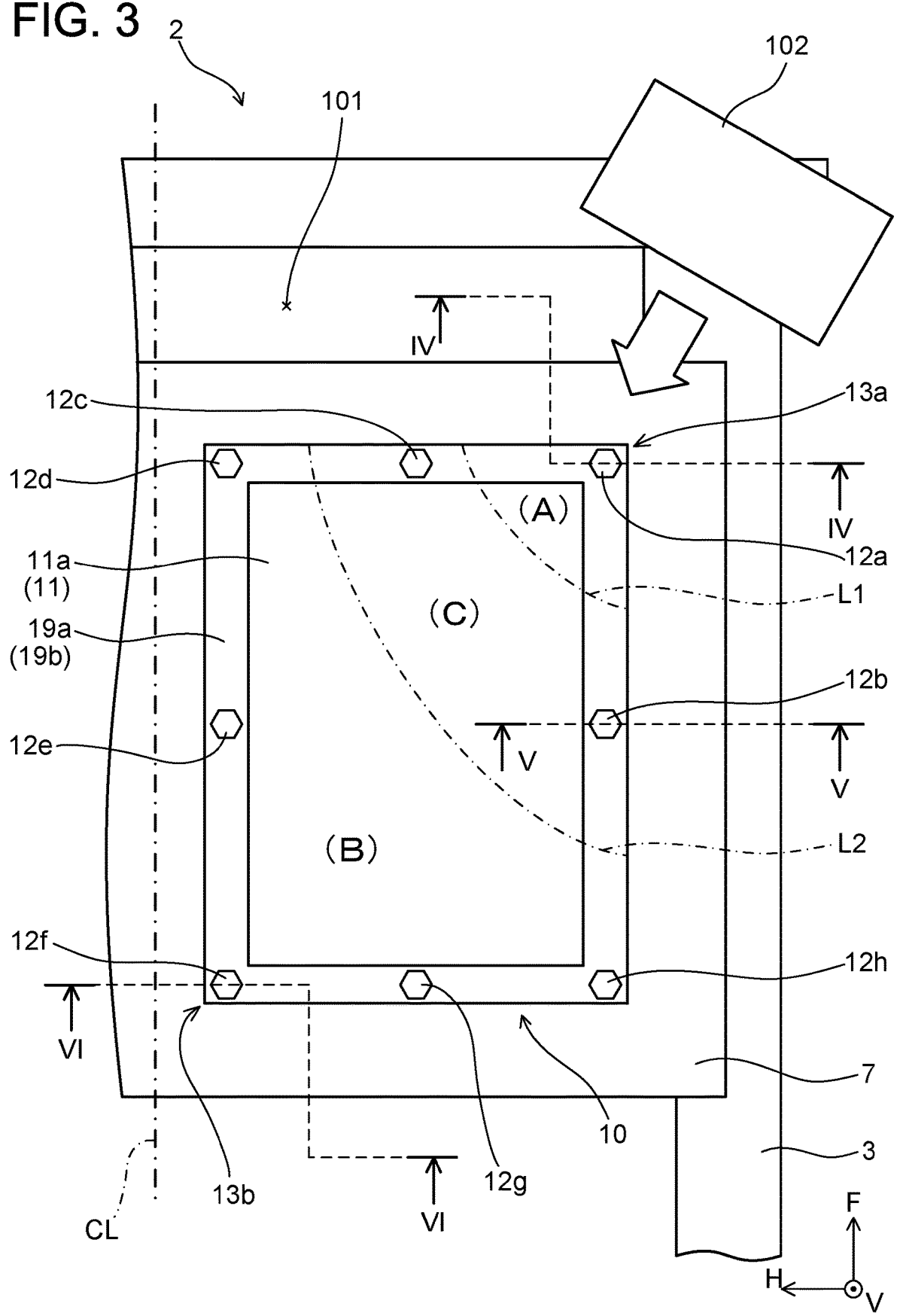
FIG. 3 is an enlarged plan view of a power converter and its surrounding.

In a coordinate system of FIGS. 1 to 3, an F axis indicates a front-rear direction of the electric vehicle 100, an H axis indicates a lateral direction of the vehicle, and a V axis indicates an up-down direction of the vehicle. A positive (+) direction on the F axis corresponds to a front side of a body, and a positive (+) direction on the V axis corresponds to an upper side of the body.

The electric vehicle 100 is configured to travel with the motor 5. The motor 5 is suspended between two side members 3 in the front compartment 101. The side members 3 are frames that serve to secure strength of the vehicle. Each of the side members 3 extends in the front-rear direction of the vehicle. The side members 3 are connected at their tip ends to a radiator frame 9. The motor 5 is suspended between the two side members 3 by brackets 4, each of which is equipped with a vibration-proof bush.

The power converter 10 is a device that converts DC electric power from a power source (not shown) into electric power for driving the motor 5. An output voltage of the power source may be 100 V or more. A casing 11 of the power converter 10 contains therein a number of components to which a voltage of 100 V or more is applied. For this reason, the vehicle-mounted structure in which the casing 11 is less likely to be damaged upon collision is desired.

A base plate 7 is placed between the two side members 3. The power converter 10 is fixed onto the base plate 7. The battery charger 6 is also fixed onto the base plate 7. The power converter 10 and the battery charger 6 are arranged side by side in the lateral direction of the vehicle. A straight line CL in the figures indicates a center line in the lateral direction of the vehicle. As shown in FIGS. 1 and 2, the power converter 10 is disposed off-center on the right side of the vehicle with respect to the center line CL of the vehicle.

FIG. 3 is an enlarged plan view of the power converter 10 and its surrounding. The casing 11 of the power converter 10 is divided into upper and lower casings in the up-down direction (see FIG. 2). The upper casing is referred to as an upper casing 11a, whereas the lower casing is referred to as a lower casing 11b. The upper casing 11a and the lower casing 11b are fastened together at locations around their openings which face each other, by a plurality of bolts. A flange 19a is provided around the opening of the upper casing 11a, whereas a flange 19b is provided around the opening of the lower casing 11b. A contact surface between the flanges 19a and 19b coincides with the horizontal plane. The flanges 19a and 19b are fixed to each other with a plurality of bolts 12a to 12h. More specifically, the flange 19a of the upper casing 11a is provided with through holes through which the bolts 12a to 12h pass. The flange 19b of the lower casing 11b is provided with bolt fixing holes located so as to face the through holes of the upper casing 11a. The bolts 12a to 12h passing through the through holes in the upper casing 11a are fixed to the respective bolt fixing holes in the lower casing 11b. Hereinafter, an arbitrary one of the bolts 12a to 12h is referred to as a bolt 12.

The power converter 10 may be seriously damaged, especially when an obstacle collides with the vehicle from its obliquely front where the power converter 10 is located.

FIG. 3 schematically shows an obstacle 102 that may crush into of the vehicle from its right front. The outline arrow indicates a direction in which the power converter 10 receives a collision load from the obstacle 102. As is clear from FIG. 3, a largest collision load is applied to a front corner 13a of the power converter 10 at a far side with respect to the center line CL. On the other hand, a collision load applied to a rear corner 13b of the power converter at a closer side with respect to the center line CL is smallest. The vehicle-mounted structure 2 of the embodiment can reduce unevenness of the load applied to the fastening parts around the casing 11. Consequently, the casing 11 is less likely to be damaged when an obstacle collides with the vehicle from its obliquely front.

Figure 4:
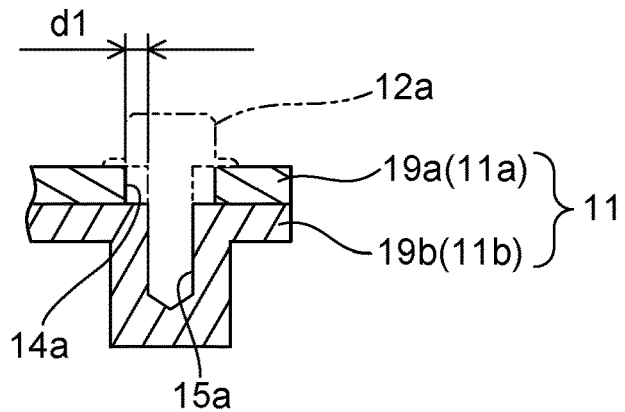
FIG. 4 is a cross-sectional view taken along a line IV-IV in FIG. 3.
Figure 5:
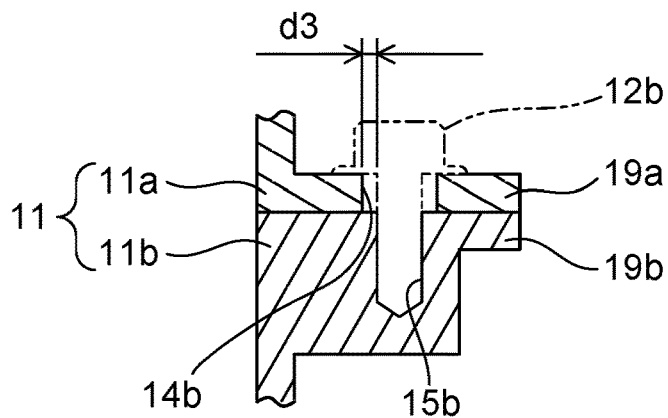
FIG. 5 is a cross-sectional view taken along a line V-V in FIG. 3.
Figure 6:
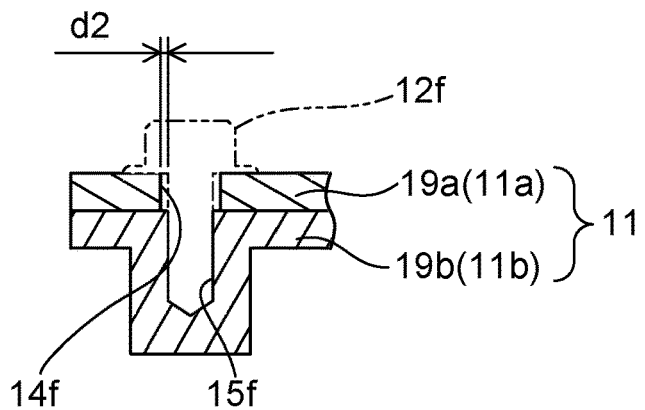
FIG. 6 is a cross-sectional view taken along a line VI-VI in FIG. 3.

FIG. 4 shows a cross section taken along the line IV-IV in FIG. 3. Specifically, FIG. 4 illustrates the cross section that crosses the bolt 12a located closest to the obstacle 102. FIG. 5 shows a cross section taken along the line V-V in FIG. 3. FIG. 6 shows a cross section taken along the line VI-VI in FIG. 3. Specifically, FIG. 6 illustrates the cross section that crosses the bolt 12f located farthest from the obstacle 102. FIG. 5 illustrates the cross section that crosses the bolt 12b located substantially at a midpoint between the bolts 12a and 12f. The bolt 12a (through hole 14a, bolt fixing hole 15a) is located at the front corner 13a of the casing 11 at the far side with respect to the center line CL of the vehicle. The bolt 12f (through hole 14f, bolt fixing hole 15f) is located at the rear corner 13b of the casing 11 at the closer side with respect to the center line CL of the vehicle (see FIG. 3).

Referring to FIGS. 4 to 6, the features of the vehicle-mounted structure 2 in the embodiment will be described below. As mentioned above, the flange 19a of the upper casing 11a is provided with the through hole 14a (14b, 14f) through which the bolt 12a (12b, 12f) passes. The flange 19b of the lower casing 11b is provided with bolt fixing holes 15a, 15b, and 15f located so as to face through holes 14a, 14b, and 14f, respectively. The bolt 12a (12b, 12f) passes through the through hole 14a (14b, 14f) and is fastened to the bolt fixing hole 15a (15b, 15f). In the vehicle-mounted structure 2 of the embodiment, a gap d1 (see FIG. 4) between the bolt 12a and the through hole 14a, which is located in the front portion of the power converter 10 and at the farther side from the center line CL in the lateral direction of the vehicle, is larger than a gap d2 (see FIG. 6) between the bolt 12f and the through hole 14f, which is located in the rear portion of the power converter 10 and at the closer side with respect to the center line CL. A gap d3 (see FIG. 5) between the bolt 12b and the through hole 14b, which is located between the through holes 14a and 14f, is smaller than the gap d1 and larger than the gap d2. Note that the term "gap" may be replaced with the term "clearance."

The relationship among the gaps d1, d2, and d3 produces the following effects. As shown in FIG. 3, the bolt 12a (through hole 14a, bolt fixing hole 15a) is located closer to the obliquely front corner of the vehicle than the bolt 12f (through hole 14f, bolt fixing hole 15f) is. When the obstacle 102 collides with the vehicle from its obliquely front corner of the vehicle, a collision impact load applied to the area around the bolt fixing hole 15a is larger than a collision impact load applied to the area around the bolt fixing hole 15f. This is because the portion of the casing 11 between the bolt fixing hole 15a and the bolt fixing hole 15f is deformed to absorb part of the applied collision impact load. By setting the gap d1 at the obliquely front of the vehicle to be larger than the gap d3 at the rear thereof, the upper casing 11a can be displaced with respect to the lower casing 11b at a greater degree in the bolt 12a than in the bolt 12f. Consequently, the load applied onto the area around the bolt fixing hole 15a, which is located at the obliquely front corner 13a of the vehicle, can be decreased. This results in a decreased difference between the loads applied respectively to the areas around the bolt fixing hole 15a and the bolt fixing hole 15f. Thus, unevenness of the collision load is alleviated, so that the casing 11 is less likely to be damaged.

The gap d3 in the bolt 12b located at the midpoint between the bolt 12a and bolt 12f is smaller than the gap d1 and larger than the gap d2. Since the bolt 12b (through hole 14b, bolt fixing hole 15b) is located at the midpoint between the bolts 12a and 12f, and the size of the gap d3 is in the range between the sizes of the gaps d1 and d2, the bolt 12b and the gap d3 do not worsen the unevenness of the collision impact load. By joining the upper casing 11a to the lower casing 11b with a larger number of bolts, the collision impact load is dispersed across the casing 11, so that the casing 11 is less likely to be damaged.

In the vehicle-mounted structure 2 of the embodiment, the gaps between the bolts 12 and the through holes 14 are classified into three types of gaps. An area (A), an area (B), and an area (C) that are separated by one-dot chain lines L1 and L2 serving as boundaries as shown in FIG. 3 have the different gaps (between the through holes 14 and the bolts 12). In the area (A) located closest to the obliquely front corner of the vehicle, its gap is the largest. In the area (B) located farthest from the obliquely front corner of the vehicle, its gap is the smallest. In the area (C) between the areas (A) and (B), its gap is smaller than the gap in the area (A) and larger than the gap in the area (B). That is, the bolts 12b and 12c have the same gap size as each other, and the bolts 12d to 12h have the same gap size as each other.

In this way, the large gap is secured in the area located close to the obliquely front corner of the vehicle, while the small gap is secured in the area located far from the obliquely front corner of the vehicle. As such, unevenness of collision impact load applied to a plurality of bolt fixing holes and their surroundings is alleviated when an obstacle collides with the vehicle from its obliquely front.

Some technical points regarding the technique disclosed in the embodiment will be described below. When the upper casing and the lower casing are joined together, a pin (knock pin) may be used for positioning. The knock pin is not a fastening member for fixing the upper casing and the lower casing. In short, the knock pin is not necessarily a component that withstands a collision impact load. If the knock pin and a plurality of bolts are used together, the bolts only need to satisfy the above-mentioned relationship among the gaps.

If the power converter is located at the center in the direction along a body width of the vehicle, the gap between the bolt located in the front portion of the power converter and the corresponding through hole may also be larger than the gap between the bolt located in the rear portion of the power converter and the corresponding through hole.

The bolt 12a, the through hole 14a, and the bolt fixing hole 15a of the embodiment correspond to examples of a first fastening member, a first through hole, and a first fixing hole, respectively. The bolt 12f, the through hole 14f, and the bolt fixing hole 15f of the embodiment correspond to examples of a second fastening member, a second through hole, and a second fixing hole, respectively. The bolt 12b, the through hole 14b, and the bolt fixing hole 15b of the embodiment correspond to examples of a third fastening member, a third through hole, and a third fixing hole, respectively.

The upper casing 11a corresponds to example of a first casing, and the lower casing 11b corresponds to example of a second casing. In the vehicle-mounted structure disclosed herein, alternatively, the lower casing may be provided with through holes, and the upper casing may be provided with fixing holes. The technique disclosed therein, specifically, the vehicle-mounted structure disclosed herein may also be applied to any electric device other than the power converter.

What is claimed is:

1. A structure of mounting an electric device in a front compartment of a vehicle, the structure comprising:
    a casing of the electric device, the casing being divided into a first casing and a second casing in an up-down direction;
    a first through hole and a second through hole provided in the first casing;
    a first fixing hole and a second fixing hole provided in the second casing;
    a first fastening member passing through the first through hole and fixed to the first fixing hole; and
    a second fastening member passing through the second through hole and fixed to the second fixing hole,
    wherein:
    the first through hole is located at a far side of the first casing with respect to a center line of the vehicle in a direction along a body width of the vehicle and located at a front half of the first casing,
    the second through hole is located at a closer side of the first casing with respect to the center line and located at a rear half of the first casing, and
    a first gap between the first fastening member and the first through hole is larger than a second gap between the second fastening member and the second through hole.

2. The structure of claim 1, wherein
    the first through hole and the first fixing hole are located at a front corner of the electric device at a far side with respect to the center line, and
    the second through hole and the second fixing hole are located at a rear corner of the electric device at a closer side with respect to the center line.

3. The structure of claim 1, wherein
    a third through hole is provided between the first through hole and the second through hole of the first casing,
    the second casing is provided with a third fixing hole,
    a third fastening member passes through the third through hole and is fixed to the third fixing hole, and
    a third gap between the third through hole and the third fastening member is smaller than the first gap and larger than the second gap.

* * * * *